FILTER CIRCUIT

Filed Dec. 28, 1967

INVENTORS.
LOUIS J. BAUDINO, JR.
BY JAMES A. BRIGHT
J. Donald Weber, Jr.
ATTORNEY.

United States Patent Office 3,559,081
Patented Jan. 26, 1971

3,559,081
FILTER CIRCUIT
Louis J. Baudino, Jr., Littleton, and James A. Bright, Denver, Colo., assignors to Honeywell Inc., Minneapolis, Minn., a corporation of Delaware
Filed Dec. 28, 1967, Ser. No. 694,194
Int. Cl. H04b *15/00*
U.S. Cl. 328—167 8 Claims

ABSTRACT OF THE DISCLOSURE

This circuit provides a switched filter network. The filter network is automatically switched as a function of the level of the signal into the filter. In addition, a level detecting network controls the filter network such that a predetermined signal level is prepared in anticipation of the succeeding gain switch signal.

There are many applications of devices which measure and/or record the average, peak or R.M.S. value of an A.C. signal. Typically, this measurement and recording is accomplished by conversion of the A.C. signal to a D.C. voltage. The conversion is made by means of a detector of suitable design, the output of which is proportional to the average, R.M.S. or peak value of the A.C. signal. The best accuracy is obtained by operating the detector over a relatively narrow dynamic range near full scale of the operating characteristic of the detector.

As an example, in A.C. voltmeters the amplification of the measured signal is varied prior to the application thereof to the detector. The variation is achieved by a manually selectable range switch on the front panel. This switch is adjusted by the operator such that the system gain maintains the meter indication near full scale. For example, if the amplitude of the input signal decreases radically during the measuring, the gain adjustment must be increased by means of the adjustment switch. Failure to change adjustment of the switch to maintain the meter reading near full scale naturally produces loss of accuracy and the like. A manual gain control is particularly troublesome in applications such as recording filter response curves with a sweep oscillator since the filter output varies over a very wide dynamic range.

In order to overcome some of these limitations, it is desirable to use an auto ranging (i.e. automatic gain changing) A.C. amplifier to supply the detector. That is, the A.C. amplifier is designed to alter the gain thereof as a function of the input signal supplied thereto. Typically, the amplifier is designed to operate at a minimum gain for a normal, full scale input signal. As the input signal decreases in amplitude, the amplifier switches such that the gain is automatically increased. Typically, the gain increase is utilized when the output signal is reduced to 10 db below full scale value.

A gain code signal is supplied by the amplifier to indicate a gain change. This signal operates a switching circuit of the filter such that a suitable capacitive network is provided. In addition, the amplifier signal is applied to a detector such that the detector output level changes with the amplifier signal. A second switching network detects the level of the signal produced by the detector and operates upon the filter network to prepare this network for the succeeding gain change signal.

More specifically, the subject filter network is intended to replace the filter at the output of a detector (e.g. A.C. to D.C. converter) when the detector is preceded by an A.C. amplifier employing discretely variable, automatic gain changes. At the moment of gain change, the detector output must change instantly to avoid loss of data. Since the filter capacitor cannot change its charge instantly, the switching circuits shown are utilized to switch a separate capacitor into the filter which capacitor is charged to the new voltage level at the output of the detector.

Consequently, one object of this invention is to provide a selectively switched filter circuit.

Another object of this invention is to provide a switchable filter circuit capable of operating with an auto-ranging A.C. to D.C. converter.

Another object of this invention is to provide a switchable filter circuit which is switched automatically as a function of the amplitude of the input signal.

Another object of this invention is to provide a switchable filter which is relatively simple in configuration and inexpensive to produce.

These and other objects and advantages of this invention will become more readily apparent when the following description is read in conjunction with the attached drawings in which.

Figures 1, 2:
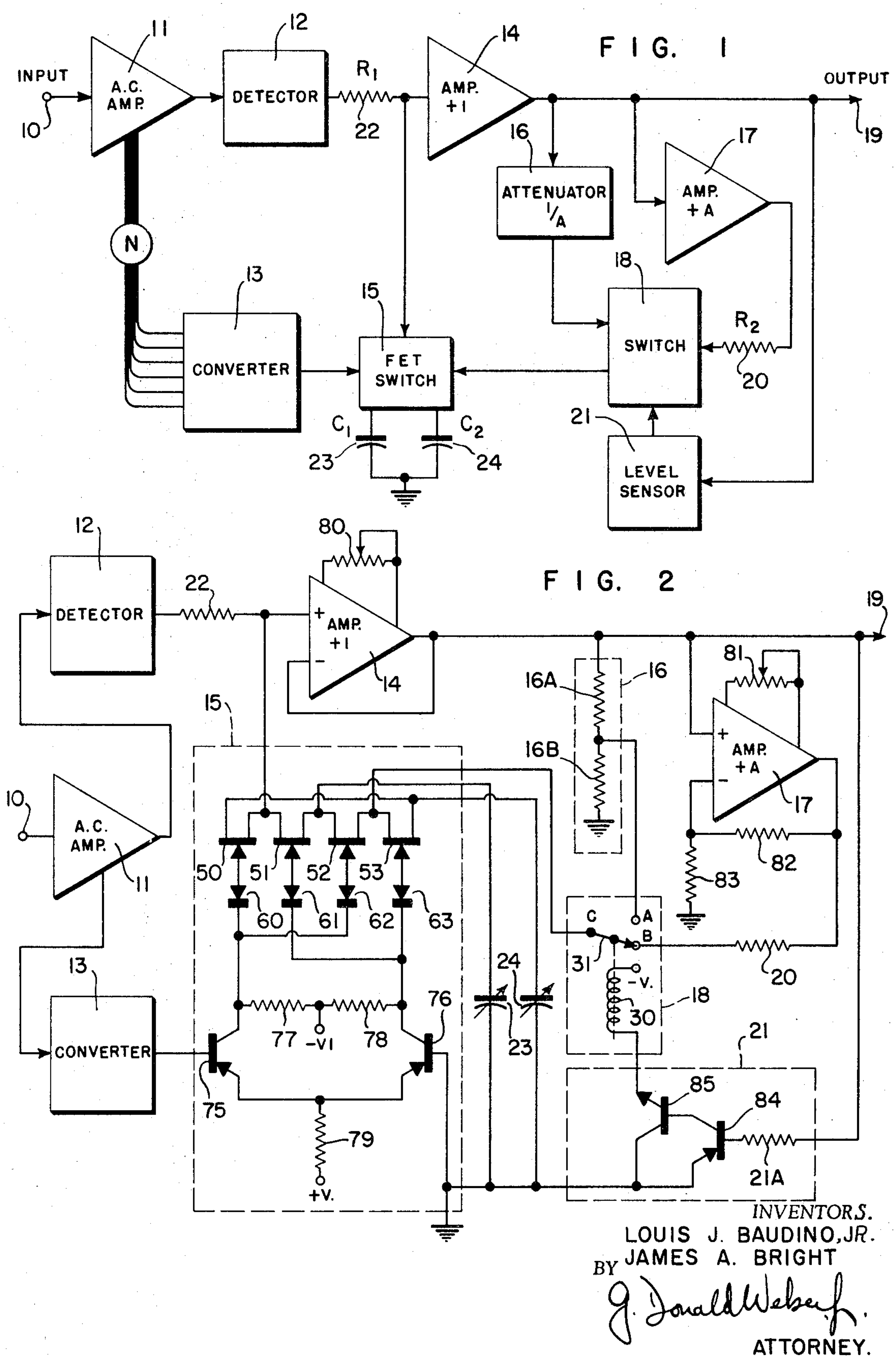
FIG. 1 is a block diagram of the switchable filter circuit.
FIG. 2 is a schematic diagram of one embodiment of the circuit shown in FIG. 1.

Referring now to FIG. 1, the block diagram of the switchable filter circuit is shown. Input terminal 10, to which an alternating signal is supplied, is connected to amplifier 11. Amplifier 11 is an A.C. amplifying network which includes means to selectively change the gain thereof when the signal supplied at input terminal 10 is reduced or increased by a predetermined factor. Typically, the predetermined factor may be equated to a 10 db change in input signal amplitude. A.C. amplifier 11 is connected via a plurality of connectors N to the converter 13. The N connectors transmit the signals which are indicative of the gain changes generated by A.C. amplifier 11. For example, in one embodiment, A.C. amplifier 11 may include three amplifier stages, each of which operates to produce two discrete amplification range changes. Thus, six gain change signals are produced wherein N represents six connectors. It is further understood, that, if necessary, suitable digital logic circuitry may be included as a buffer input or the like to converter 13.

Converter 13 includes circuitry which is operative to convert the N signals, which are parallel in nature, to a plurality of signals which are serial in nature. In addition, converter 13 operates on the N input signals which are of a single polarity (for example 0 to +5 volts) to produce output signals which alternate between different polarities (for example −5 to +5 volts).

Converter 13 is connected to FET switch circuit 15 and provides signals thereto. FET switch circuit 15 comprises field-effect transistors (FET) connected to operate equivalent to a two-pole, form C, switch circuit. The FET switch circuit 15 is connected to capacitors 23 and 24 which are referenced to ground. Capacitors 23 and 24, as will appear hereinafter, may be variable capacitors and are characterized by capacitance C1 and C2, respectively. The capacitances C1 and C2 of the capacitors 23 and 24 are identical.

A.C. amplifier 11 is connected to and provides amplified signals to detector 12. Detector 12 may be any suitable circuitry which operates to produce linear signals or signal which follows a square law or the like. Detector 12 is connected to FET switch 15 via resistor 22. Resistor 22 has the resistance value $R_1$. For example, the resistance $R_1$ may be on the order of 1 megohm. The output signal produced by detector 12 is supplied by resistor 22 to one of the capacitors 23 and 24 depending upon the condition of FET's switch 15. Thus, the frequency response of the filter circuit is determined by $R_1 C_1$ or $R_1 C_2$.

In addition, resistor 22 is connected to the input of amplifier 14 which is connected in a non-inverting configuration and has unity gain. The output of amplifier 14 is connected to output terminal 19 and supplies output signals thereto. In addition, the output of amplifier 14 is connected to attenuator 16. Attenuator 16 may be any suitable attenuator, for example a resistance network and is designed to have an attenuating factor of $1/A$. The output of attenuator 16 is connected to one input of switch 18.

The output of amplifier 14 is further connected to one input of amplifier 17. Amplifier 17 is an operational amplifier connected in the non-inverting configuration and having a gain of +A. Thus, amplifier 17 and attenuator 16 have reciprocal gain functions. The output of amplifier 17 is connected via resistor 20 to another input of switch 18. The value R2 of resistor 20 is very small relative to the value $R_1$ of resistor 22. Thus, the time constant $R_2 C_1$ or $R_2 C_2$ is much less than the $R_1$ time constant. Therefore, the capacitor associated with the resistor 20 charges more quickly than the capacitor associated with resistor 22.

The output of amplifier 14 is further connected to an input of level sensor 21. Level sensor 21 may be any typical circuitry which is utilized to sense the level of the output signal and produce a control signal as a result thereof. The output of level sensor 21 is connected to a further input of a switch 18. Switch 18 is connected to FET switch 15 and selectively transmits a voltage signal generated by attenuator 16 or amplifier 17 to the standby capacitor 23 or 24, as the case may be. Switch 18 is controlled by level sensor 21 thereby selecting the potential which is supplied via FET switch 15.

In operation, signals are supplied at input 10. The A.C. input signals may have varying amplitudes. A.C. amplifier 11 includes means for amplifying the signal supplied thereto as well as automatic gain control which operates to change the gain function of the amplifier when the output signal is reduced by a predetermined amount, for example 10 db, below full scale or increased above full scale. Each time amplifier 11 switches to increase or decrease gain, a signal is supplied along one of the N connectors to converter 13. Converter 13 provides a signal to FET switch 15 to select one or the other of capacitors 23 and 24. Amplifier 11 provides an A.C. signal to detector 12 which detects the signal supplied thereto and, in conjunction with the filter, converts the signal to D.C. This D.C. may be proportional to the average, R.M.S., or peak value of the A.C. signal depending upon the type of detector used. Detector 12 supplies the signal via resistor 22 to the capacitor which has been selected by FET switch 15. Moreover, if amplifier 11 switches gain factor and increases or decreases the amplitude of the output signal, the output of detector 12 switches instantaneously to the new value.

In addition, the signal supplied by detector 12 is applied to amplifier 14. This amplifier is a high impedance input, low impedance output amplifier. The high input impedance may be provided by an FET input stage (not shown) whereby voltage offsets caused by input current are avoided. The high impedance input effectively unloads the filter network while the low impedance output provides a desirable drive characteristic for subsequent circuitry. The output of amplifier 14 is applied to attenuator 16 and amplifier 17. Attenuator 16 reduces the signal supplied thereto by a predetermined factor for example 0.1. Amplifier 17 conversely, amplifies the same signal via a predetermined function for example 10. These signals are supplied to switch circuit 18. Level sensor 21 detects the output signal at output 19. If the output signal is a relatively high signal, switch 18 selects the output of attenuator 16. If the output signal is a relatively low signal, switch 18 selects the output of amplifier 17. Actually, switch 18 selects the appropriate signal level as a function of the signal supplied by the level sensor 21.

The signal selected by switch 18 is supplied to FET switch 15 and applied to the standby capacitor 23 or 24. That is, one of the capacitors has been connected by FET switch 15 to resistor 22. The signal supplied, via resistor 22, directly to switch 15 is stored in the selected capacitor. Since this signal is stored in one capacitor, it is clear that an opposite level signal will be required at the next switching. That is, because of the gain switching of amplifier 11, and the instantaneous following thereof by detector 12, the output signal produced by amplifier 12 will vary. For example, the output signal produced by detector 12 may have a level or −0.1 to −1.0 volt. Thus, for example, as capacitor 23 is charged to a −1.0 volt level due to a −1.0 volt output from detector 12, capacitor 24 will be charged to a −0.1 volt level inasmuch as the next signal level produced by detector 12 will be −0.1 volt.

More particularly, the −1.0 volt signal is supplied by detector 12 to amplifier 14 and, thence, to output terminal 19. In addition, the −1.0 volt signal is supplied to the inputs of attenuator 16 and amplifier 17. Amplifier 17 produces an output signal of −10.0 volts while attenuator 16 provides a −0.1 volt output signal. These signals are supplied to switch 18. Furthermore, the −1.0 volt signal is applied to level sensor 21. Level sensor 21 is designed to detect the level of the output signal. Since the output signal is greater than 0.5 volt, for example, switch 18 is activated to connect the output of attenuator 16 to the FET switch 15 and, thence, to the appropriate capacitor.

On the contrary, if the signal supplied by detector 12 is a −0.1 volt signal, this signal is applied to one of the capacitors, again, for example, capacitor 23. Amplifier 14 provides the −0.1 output signal as noted supra. Attenuator 16 provides a −0.01 volt signal to switch 18 while amplifier 17 provides a −1.0 volt signal to switch 18. Level sensor 21 detects the signal which is below the 0.5 volt magnitude wherein switch 18 is activated to connect the amplifier 17 output to the FET switch 15. The −1.0 volt output from amplifier 17 is then applied to the other capacitor (namely capacitor 24) wherein a −1.0 volt signal is stored thereacross.

Referring now to FIG. 2, there is shown a more detailed schematic of the circuit shown in FIG. 1. In FIG. 2, similar components bear similar reference numerals. Thus, input terminal 10 is connected to variable gain A.C. amplifier network 11. Amplifier network 11 is connected in parallel to serial converter 13. The output of amplifier 11 is further connected to the input of detector 12. The output of detector 12 is connected via resistor 22 to the noninverting input of unity gain amplifier 14. Variable resistor 80 is connected to the operational amplifier 14 to provide an offset adjustment such that the output voltage may be adjusted to zero when the input voltage is zero. The output of amplifier 14 is fed back to the inverting input thereof and provides stability to the circuit. The output of amplifier 14 is connected to output terminal 19.

In addition, the output of amplifier 14 is connected to attenuator 16. Attenuator 16 comprises a voltage divider network including resistors 16A and 16B connected in series. The resistors are connected between the output of amplifier 14 and ground. The common junction between resistors 16A and 16B are connected to contact A of switch 31 of the switching network 18. Resistors 16A and 16B are related such that the voltage at the common junction is 0.1 of the voltage supplied by amplifier 14.

The output of amplifier 14 is further connected to the noninverting input of amplifier 17. Variable resistor 81 is utilized to provide the offset voltage control for amplifier 17. The output of amplifier 17 is connected to the inverting input of amplifier 17 via feedback resistors 82 and 83. Amplifier 17 is connected to produce a gain function which is the reciprocal of the attenuation function of attenuator 16, for example 10. The output of amplifier 17 is further connected via resistor 20 to contact B of switch 31.

The output of amplifier 14 is further connected via resistor 21A to the base of transistor 84. The collector of transistor 84 is connected to the base of transistor 85. The collector of transistor 85 and the emitter of transistor 84 are connected together and to ground or other suitable reference potential. The emitter of transistor 85 is connected to one end of coil 30 which is associated with switch 31, to control the condition of the armature thereof. The other end of coil 30 is referenced to a source —V. Transistors 84 and 85 effectively provide the level sensor network 21.

The output of converter 13 is connected to the base of transistor 75. The emitter of transistor 75 is connected to the emitter of transistor 76. The emitters are connected via common resistor 79 to a voltage source +V. The base of transistor 76 is connected to ground. The collectors of transistors 75 and 76 are connected to a voltage source —V1 via resistors 77 and 78, respectively.

In addition, the collector of transistor 75 is connected to the cathodes of diodes 60 and 62 while the collector of transistor 76 is connected to the cathodes of diodes 61 and 63. The anodes of diodes 60, 61, 62 and 63 are connected to the gate electrodes of FET's 50, 51, 52 and 53, respectively. The source electrode of FET 50 is connected to the drain electrode of FET 30 and to one terminal of filter capacitor 24. The other terminal of capacitor 24 is connected to ground. The source electrode of FET 73 is connected to the drain electrode of FET 52 and to the armature C of switch 31. The source electrode of FET 52 is connected to the drain electrode of FET 51 and to one side of filter capacitor 23. The other side of capacitor 23 is connected to ground. The source electrode of FET 51 is connected to the drain electrode of FET 50 and to detector 12 via filter resistor 22. Capacitors 24 and 25 may be variable (as shown) or a plurality of constant capacitors in order to obtain flexibility.

As described supra, output signals from detector 12 are supplied via resistor 22 to the input of amplifier 14. The output signal of amplifier 14 is supplied to attenuator 16, amplifier 17 and level sensor 21. Attenuator 16 reduces the signal supplied thereto by the reciprocal to the gain function of amplifier 17 and supplies this signal at contact A of switch 31. Contrariwise, amplifier 17 amplifies the signal supplied thereto and applies the amplified signal to contact B of switch 31. Level sensor 21 controls the operation of switch 31 by the selective energization of coil 30. Since the emitter of transistor 84 is returned to ground, transistor 84 will be rendered conductive when the base voltage thereof is more negative than —0.5 volt. Conversely, transistor 84 is nonconductive when the base voltage is more positive than —0.5 volt. Resistor 21A limits the current through transistor 84 when conductive.

It is obvious that the transition level of level sensor 21 can be controlled by means of addition of a bias voltage or the like at the transistor 84. Moreover, the illustrative values noted supra are appropriate for a full scale filter output of —1.0 volt. If the output signal is varied, the transition voltage may require modification.

When coil 30 of switch 31 is deenergized, switch 31 is engaged with contact B such that the output of amplifier 17 is applied to the FET switching circuit 15. Conversely, when coil 30 is energized, switch 31 is engaged with contact A wherein the attenuated signal from attenuator 16 is applied to the FET switching circuit 15. Thus, the level of the output signal determines the condition of switch 31 and, therefore, the level of the signal is supplied to the appropriate storage capacitor.

Converter 13 supplies a signal to the base of transistor 75. Transistors 75 and 76 are connected in differential amplifier configuration. The signal supplied by converter 13 may be, typically, +5 volts or —5 volts alternatively where each level change indicates a gain function switching operation at amplifier 11.

With a negative signal supplied by converter 13, transistor 75 is rendered conductive. Because of the common emitter current source, transistor 76 is effectively "starved" and turned off. The transistor conditions cause the application of a relatively positive signal at the cathodes of diodes 60 and 62 whereby these diodes are turned off and a relatively negative potential at the cathodes of diodes 61 and 63 whereby these diodes are effectively turned on. When diodes 60 and 62 are turned off, FET's 50 and 52 are turned on. Thus, the output of detector 12 is connected, via resistor 22 and conductive FET 50, to capacitor 24. In addition, armature C of switch 31 is connected via conductive FET 52 to capacitor 23. FET's 51 and 53 are nonconductive because of the condition of the diodes associated with the gate electrodes thereof.

On the contrary, when transistor 75 is turned off due to the application of a positive signal thereto by converter 13, transistor 76 is effectively rendered conductive. A relatively positive potential is now applied at the cathodes of diodes 61 and 63 rendering these diodes nonconductive while a relatively negative potential is supplied at the cathodes of diodes 60 and 62 rendering these diodes conductive. When diodes 60 and 62 are conductive, FET's 50 and 52 are nonconductive. Conversely, when diodes 61 and 63 are nonconductive, FET's 51 and 53 are conductive.

With FET'S 51 and 53 conductive, the output of detector 12 is connected, via resistor 22 and FET 51 to capacitor 23, while the armature C of switch 31 is connected via FET 53 to capacitor 24. Thus, the connection of the capacitors to the output of detector 12 or to the armature of switch C is controlled by the condition of FET switch network 15. The conditions of FET switch network 15 is controlled by the output condition of converter 13.

Therefore, it is seen that FET switch 15, as a function of the input from converter 13, controls the filter capacitors 23 and 24 relative to the signal which is supplied thereto. Switch 18 as a function of the signal supplied by level sensor 21 and controls the level of the signal which is to be stored in the capacitors as defined by the FET switching network 15.

The switching networks work in conjunction with each other and the input circuit to produce automatically switched filter networks wherein the signal produced thereby is maintained at a suitable range of the operative scale. The filter circuit permits extremely rapid switching inasmuch as the circuit is always maintained in a stand-by condition for the next possible operating state.

Certain modifications to the circuit described supra may be suggested to those skilled in the art. However, so long as these modifications fall within the inventative concepts, modifications are meant to be included within the description. Furthermore, the embodiment described is illustrative only of a preferred embodiment and is not intended to be limitative of the invention.

The embodiments of the invention in which an exclusive property or privilege is claimed are defined as follows:

1. In a filter circuit, the combination comprising input means supplying an A.C. signal, switch means connected to said input means, said switch means being responsive to an operating characteristic of said input means to control the actuation thereof as a function of said operating characteristics of said input means, storage means including a first and a second storage element, said storage elements being alternately and selectively connected to said input means via said switch means in accordance with the condition of said switch means for applying a primary signal from said input means to the selected one of said storage elements, function means for deriving a secondary signal from said input means, and control means connected between said function means and said storage elements to supply said secondary signal to the unselected one of said storage elements wherein said secondary signal is a function of the A.C. signal supplied by said input means.

2. The filter circuit recited in claim 1 wherein said input means comprises a variable gain A.C. amplifier, said A.C. amplifier being operative to produce a code signal for each gain change, means for operating on said code signals to produce a switching signal which is supplied to said switch means to control the condition thereof.

3. The filter circuit recited in claim 1 wherein said function means includes attenuating means and amplifying means, said attenuating means and said amplifying means each being connected to said input means to receive signals therefrom, and said control means includes a second switch means connected to selectively connect said attenuating means and said amplifier means to said unselected one of said storage elements through said first mentioned switch means.

4. The filter circuit recited in claim 2 wherein said switch means includes field effect transistors which are controlled by the application of said switching signals to the gate electrode thereof.

5. The filter circuit recited in claim 1 wherein said storage elements comprise identical capacitor circuits, and impedance means connected between said input means and switch means to provide a series circuit comprising said impedance means and the selected one of said capacitor circuits, each of said capacitor circuits alternatively and separately connect to receive said primary signal from said switch means through impedance means and said secondary signal from said control means such that the separate capacitor circuits receive separate signals.

6. The filter circuit recited in claim 3 wherein said control means includes level sensor means connected between said input means and said second switch means, said level sensor operative to detect the level of the signal produced by said input means such that the condition of said second switch means is controlled as a function thereof.

7. The filter circuit recited in claim 6 wherein said level sensor comprises a transistor circuit, said second switch means comprises a relay, and said attenuating means and said amplifying means provide reciprocal operating factors.

8. The filter circuit recited in claim 1 including unity gain amplifier means connected between said input means and said control means to provide isolation therebetween, said unity gain amplifier means having high input impedance and low output impedance.

References Cited

UNITED STATES PATENTS

| | | | |
|---|---|---|---|
| 2,685,676 | 8/1954 | Williams, Jr. | 333—70X |
| 2,824,297 | 2/1958 | Josias et al. | 324—115X |
| 3,041,479 | 6/1962 | Sikorra | 328—166X |
| 3,401,344 | 9/1968 | Andrus et al. | 307—251X |
| 3,448,391 | 6/1969 | Hutchinson et al. | 328—67X |

DONALD D. FORRER, Primary Examiner

R. C. WOODBRIDGE, Assistant Examiner

U.S. Cl. X.R.

307—233, 246, 295; 328—67, 149; 333—70